(12) United States Patent
Nakamura

(10) Patent No.: US 7,580,147 B2
(45) Date of Patent: Aug. 25, 2009

(54) DEVICE, DATA PROCESSING METHOD, AND PROGRAM FOR GENERATING INFORMATION ABOUT JOBS

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 11/286,816

(22) Filed: Nov. 23, 2005

(65) Prior Publication Data
US 2006/0114501 A1 Jun. 1, 2006

(30) Foreign Application Priority Data
Nov. 30, 2004 (JP) ............................. 2004-347073

(51) Int. Cl.
*G06F 3/12* (2006.01)
*G06K 15/00* (2006.01)
(52) U.S. Cl. ..................................... 358/1.15; 358/1.14
(58) Field of Classification Search ................. 358/1.1, 358/1.8, 1.13, 1.14, 1.15, 402; 709/201, 709/213, 248
See application file for complete search history.

(56) References Cited

U.S. PATENT DOCUMENTS

| 6,301,012 | B1* | 10/2001 | White et al. ............... 358/1.15 |
| 6,604,212 | B2* | 8/2003 | Sekizawa .................... 714/47 |
| 2002/0065940 | A1* | 5/2002 | Suzuki et al. ............... 709/248 |
| 2004/0141201 | A1* | 7/2004 | Shima ........................ 358/1.15 |

FOREIGN PATENT DOCUMENTS

| CN | 1504909 A | 6/2004 |
| JP | 11-143665 A | 5/1999 |
| JP | 2000-187582 A | 7/2000 |
| JP | 2004-139579 A | 5/2004 |

* cited by examiner

*Primary Examiner*—Gabriel I Garcia
(74) *Attorney, Agent, or Firm*—Canon U.S.A., Inc. I.P. Division

(57) ABSTRACT

In a case where a device fails to obtain time information, information relating to a job is generated based on an elapsed time from start of the device, thereby specifying the job processing time later. Or, in a case where a device fails to obtain time information, the device does not perform printing based on the job, thus preventing the job processing time from being set to unknown.

8 Claims, 7 Drawing Sheets

| LI | VN | Mode | Stratum | Poll | Precision |
|---|---|---|---|---|---|
| Root Delay ||||||
| Root Dispersion ||||||
| Reference Identifier ||||||
| Reference Timestamp (64) ||||||
| Originate Timestamp (64) ||||||
| Receive Timestamp (64) ||||||
| Transmit Timestamp (64) ||||||
| Key Identifier (optional) (32) ||||||
| Message Digest (optional) (128) ||||||

FIG. 9
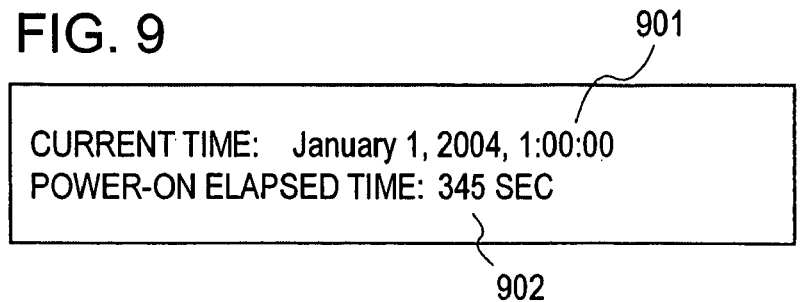
```
CURRENT TIME:       January 1, 2004, 1:00:00      901
POWER-ON ELAPSED TIME: 345 SEC
                                                   902
```
FIG. 10
```
JOB NAME:              XXXX
USER NAME:             USER 1
NUMBER OF PRINTED PAGES:  10
PRINTING RESULT:       OK
PRINTING TIME:         January 1, 2004, 1:00:00
PERIOD OF TIME AT TIME OF PRINTING:   345 SEC
```
FIG. 11
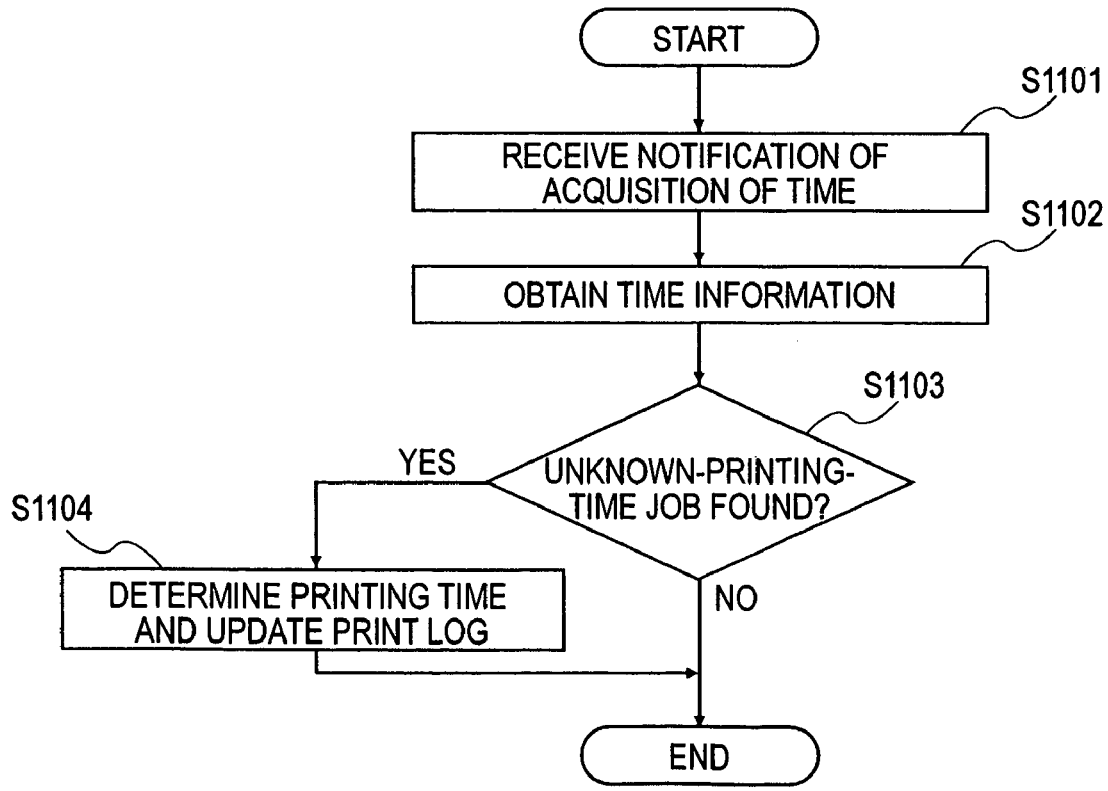

| PRINT LOG |||||
|---|---|---|---|---|
| JOB NAME | USER NAME | NUMBER OF PAGES | RESULT | PRINTING TIME |
| JOB1 | USER1 | 5 | OK | January 1, 2004, 1:00:00 |
| JOB2 | USER2 | 10 | OK | January 1, 2004, 2:34:56 |
| JOB3 | USER3 | 7 | OK | UNKNOWN |

From: printer1@xxxx.co.jp
To: admin@xxxx.co.jp
Subject: print log

| | |
|---|---|
| JOB NAME: | XXXX |
| USER NAME: | USER 1 |
| NUMBER OF PRINTED PAGES: | 10 |
| PRINTING RESULT: | OK |
| PRINTING TIME: | 0 |
| PERIOD OF TIME AT TIME OF PRINTING: | 345 SEC |

FIG. 15

1501 {
Received: from mail.xxxx.co.jp
by printer.xxxx.co.jp
 Sun, 1 Jan 2004 1:00:00 +0900

From: printer1@xxxx.co.jp
To: admin@xxxx.co.jp
Subject: print log

| | |
|---|---|
| JOB NAME: | XXXX |
| USER NAME: | USER 1 |
| NUMBER OF PRINTED PAGES: | 10 |
| PRINTING RESULT: | OK |
| PRINTING DATE AND TIME: | 0 |
| PERIOD OF TIME AT TIME OF PRINTING: | 345 SEC |

FIG. 16

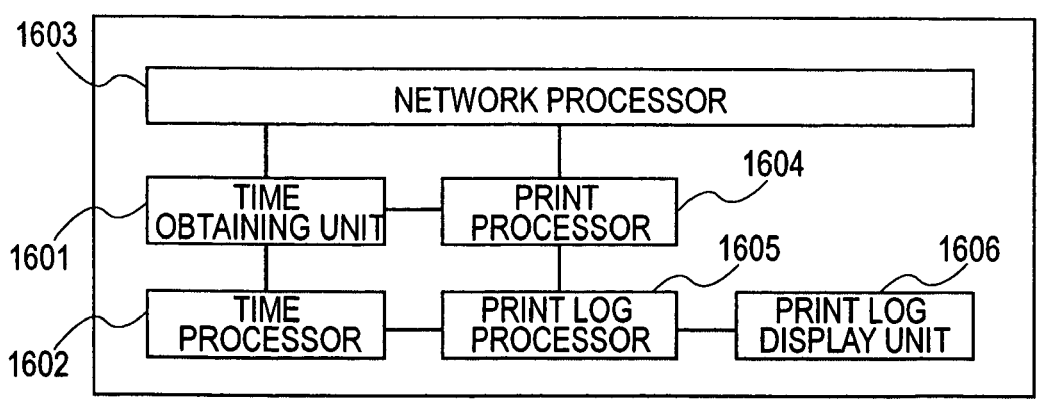

DEVICE, DATA PROCESSING METHOD, AND PROGRAM FOR GENERATING INFORMATION ABOUT JOBS

BACKGROUND OF THE INVENTION

1. Field of the Invention

The present invention relates to a technique for generating information about jobs such as print jobs.

2. Description of the Related Art

Devices connected to a network to perform printing in response to a request from a computer or terminal via the network, such as printers and multifunction machines, have become available. Such network devices store a print log including information as to which users sent which print job requests. The stored print log is transmitted to the computer via the network, displayed on panels of the network devices, or is printed. The print log allows the administrators of the network devices to understand the usage status of the network devices. The print log generally includes information indicating a user name, a job name, the number of printed pages, a printing result, and the printing time.

Some of the network devices have no real time clock (RTC). Such devices obtain time information indicating the current time from a server on a network, and use the time information to perform processing later. One known method to obtain the time from a server is to use the simple network time protocol (SNTP) specified by RFC (Request for Comments) 2030.

SNTP provides three modes for a client to obtain time from a server. The first mode is a unicast mode. In the unicast mode, a client transmits a request to a specified server, and the server returns a response including time information to the client. The second mode is a multicast mode. In the multicast mode, a server periodically transmits time information to a local broadcast address or a multicast address, and a client receives the time information. The third mode is an anycast mode. In the anycast mode, a client transmits a request to a local broadcast address or a multicast address, and a server receives the request and returns a response including time information via unicast. In the anycast mode, when there are multiple servers, the client receives multiple responses. In this case, the client uses the first received response.

FIG. 1 shows the SNTP message format. The type of a request and response used in the three modes is identified by the value set in a "Mode", field in the message format. The SNTP client function described above allows the network devices to obtain the current time even without the RTC function, and allows information indicating the printing time to be included in a print log.

Also, Japanese Patent Laid-Open No. 11-143665 discloses a printing control system for obtaining time information from a server using the network time protocol (NTP).

However, devices designed to obtain time information from a server on a network at the time of turning on power and to generate a print log using the time information sometimes experience problems when the devices fail to obtain the time information. If a device fails to obtain time information from a server for some reason, the device cannot specify the current time when printing is performed. Therefore, the device cannot generate a print log including printing-time information, and the device administrator does not know the printing time even when the administrator views the print log later.

It is therefore desirable to specify the job processing time even if a device fails to obtain time information. Or, it is desirable to prevent the job processing time from being set to unknown even if a device fails to obtain time information.

SUMMARY OF THE INVENTION

The present invention provides a device including a first counting unit adapted to count an elapsed time from start of the device, an obtaining unit adapted to obtain time information indicating time from a server device on a network, a second counting unit adapted to count a current time based on the time indicated by the time information obtained by the obtaining unit, and a generating unit adapted to generate information relating to a job based on the elapsed time counted by the first counting unit before the obtaining unit obtains the time information.

The present invention further provides a device including an obtaining unit adapted to obtain time information indicating time from a server device on a network, a counting unit adapted to count a current time based on the time indicated by the time information obtained by the obtaining unit, a generating unit adapted to generate information relating to a job, and an e-mail transmitting unit adapted to transmit the information generated by the generating unit via e-mail before the obtaining unit obtains the time information.

The present invention further provides a device including an obtaining unit adapted to obtain time information indicating time from a server device on a network, a counting unit adapted to count a current time based on the time indicated by the time information obtained by the obtaining unit, a generating unit adapted to generate information relating to a job, and a printing unit adapted to perform printing based on the job. Before the obtaining unit obtains the time information, the printing unit does not perform printing.

Further features of the present invention will become apparent from the following description of exemplary embodiments with reference to the attached drawings.

BRIEF DESCRIPTION OF THE DRAWINGS

FIG. 9 is a diagram showing exemplary time information returned from a time processor 402.

FIG. 10 is a diagram showing an exemplary print log generated by the print log processor 405.

FIG. 11 is a flowchart showing an exemplary internal operation of the print log processor 405 in response to a time obtaining event.

FIG. 14 is a diagram showing exemplary e-mail transmitted by the image forming device according to the second embodiment.

FIG. 15 is a diagram showing exemplary e-mail received by an administrator according to the second embodiment.

FIG. 16 is a block diagram showing an exemplary software configuration of an image forming device according to a third embodiment of the present invention.

DESCRIPTION OF THE EMBODIMENTS

The present invention will now be described in detail below with reference to the drawings in the context to various embodiments, features and aspects of the present invention.

First Exemplary Embodiment

Figures 1, 2:
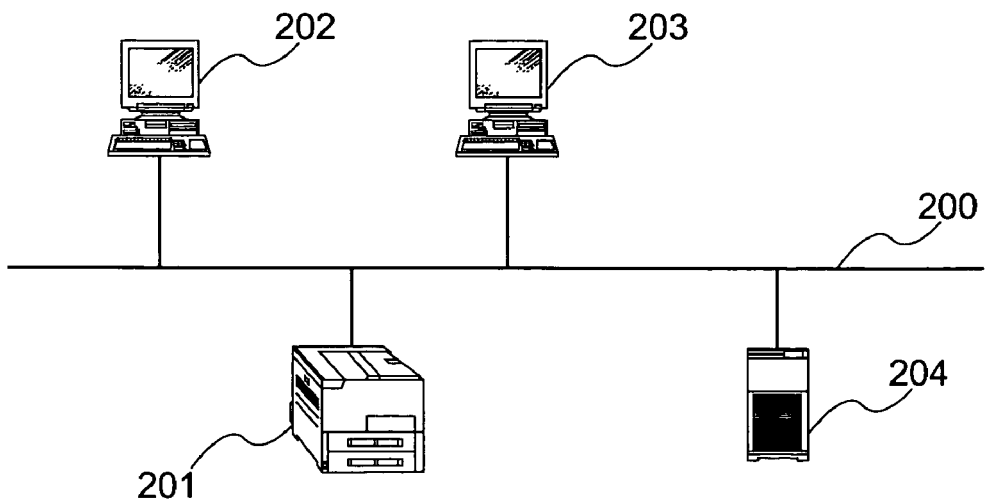
FIG. 1 is a diagram showing the packet structure of an SNTP message.
FIG. 2 is a block diagram showing an example configuration of a printing system according to a first embodiment of the present invention.

FIG. 2 is a block diagram showing an example configuration of a printing system according to a first embodiment of the present invention. An image forming device 201 is connected to a network 200 so as to be capable of communication with host computers 202 and 203. Upon receipt of print jobs from the host computers 202 and 203, the image forming device 201 performs printing based on the received print jobs, and keeps a print log of the print jobs. The image forming device 201 is also capable of obtaining time information from a server 204 using SNTP.

Figure 3:
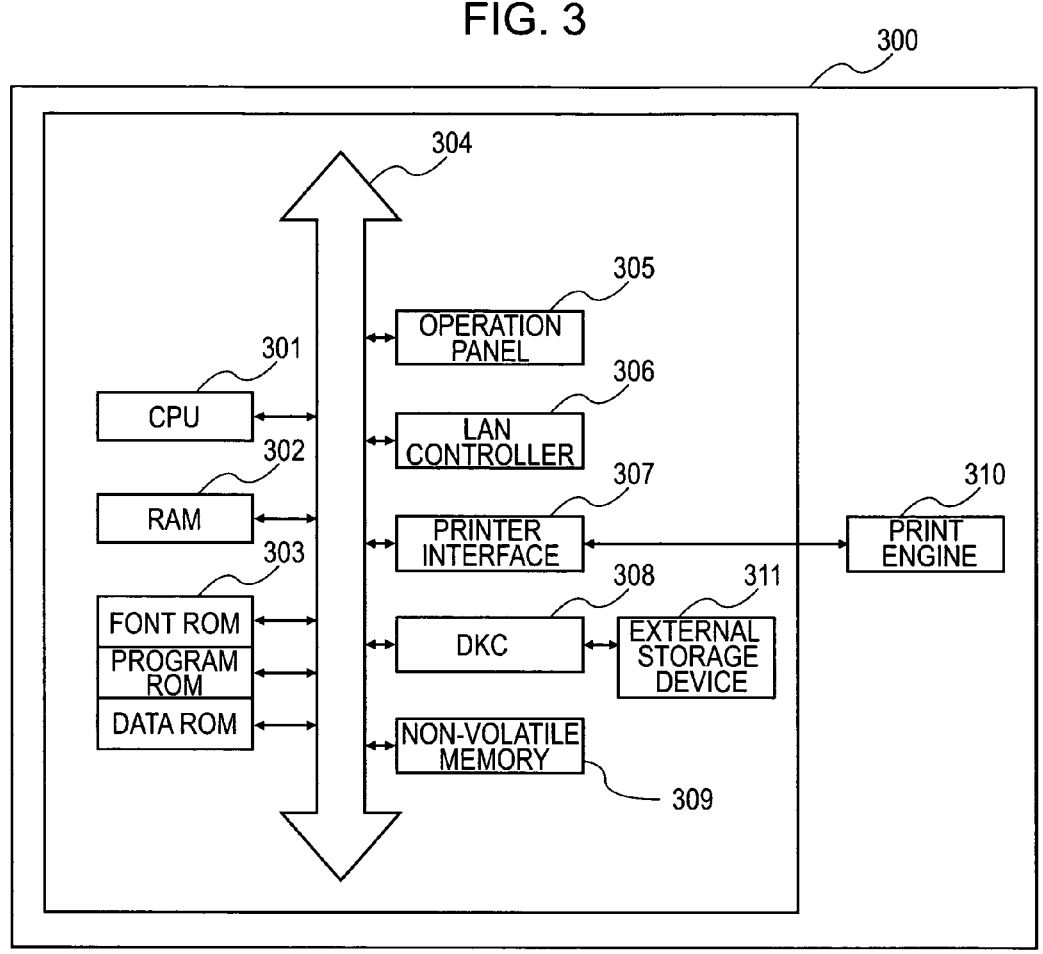
FIG. 3 is a block diagram showing an exemplary hardware configuration of an image forming device according to the first embodiment.

FIG. 3 is a block diagram showing the hardware configuration of the image forming device 201 in the context of a laser beam printer 300. The printer 300 shown in FIG. 3 includes a printer central processing unit (CPU) 301. The CPU 301 controls access to various devices connected to a system bus 304 according to a control program stored in a program read-only memory (ROM) in a ROM 303. The CPU 301 further outputs an image signal as output information to a printer unit (print engine) 310 connected via a printer interface 307 according to the control program. The program ROM in the ROM 303 stores the control program executable on the CPU 301. The ROM 303 further includes a font ROM that stores font data (including outline font data) used for generating the output information, and data ROM that stores information used in a host computer. The CPU 301 is capable of communication with a host computer on a network via a local area network (LAN) controller 306. A random access memory (RAM) 302 functions as a main memory or a work area for the CPU 301, and is designed so that its memory capacity can be increased by using an optional RAM connected to an expansion port (not shown). The RAM 302 is used as an output information loading area, an environmental data storage area, or the like. A disk controller (DKC) 308 controls access of an external storage device 311, such as a hard disk (HD) or an integrated circuit (IC) card. The HD stores font data, an emulation program, form data, etc., and is used as a job storage area for temporarily spooling print jobs and controlling the spooled jobs from the outside. An operation panel 305 allows a user to input various information from software keys. The number of external storage devices 311 is not limited to one. At least one external storage device 311 may be provided so that a plurality of external memories including internal font sets, option-font cards, and programs for interpreting different printer control languages can be connected. A non-volatile memory 309 stores printer setting information from the operation panel 305.

Although not shown in FIG. 3, the printer 300 may also be provided with various optional enhanced devices, such as a finisher having stapling and sorting capabilities and a two-sided device for achieving a two-sided printing function. The CPU 301 controls the operation of these devices.

Figure 4:
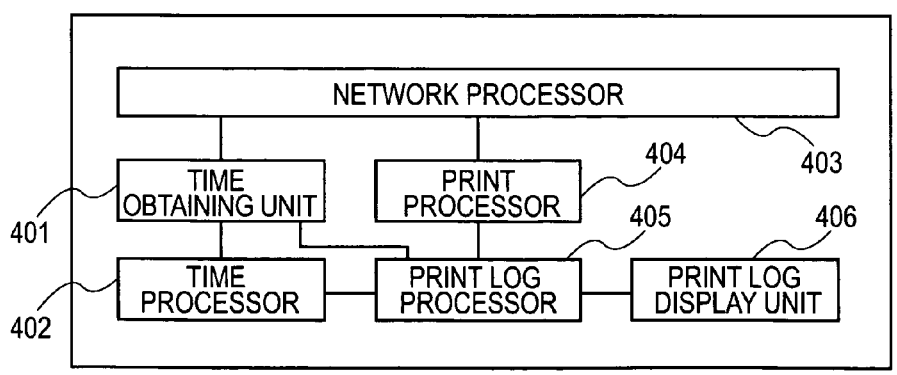
FIG. 4 is a block diagram showing an exemplary software configuration of the image forming device according to the first embodiment.

FIG. 4 is a block diagram showing an exemplary software configuration of the image forming device 201. A time obtaining unit 401 obtains time information from the server 204 via a network processor 403 using SNTP. The time obtaining unit 401 transmits the obtained time information to a time processor 402, and the time processor 402 manages the time thereafter. When the network processor 403 receives a print job from a host computer, a print processor 404 performs printing based on the received print job. After the printing processing, the print processor 404 notifies a print log processor 405 of completion of the printing processing. The print log processor 405 generates a print log and stores the generated print log in the non-volatile memory 309, as discussed below. The print log processor 405 further updates the stored print log, or retrieves and transmits the print log to a print log display unit 406 in response to a request from the print log display unit 406. The print log display unit 406 controls the operation panel 305 so that the print log is displayed on the operation panel 305.

Figure 5:
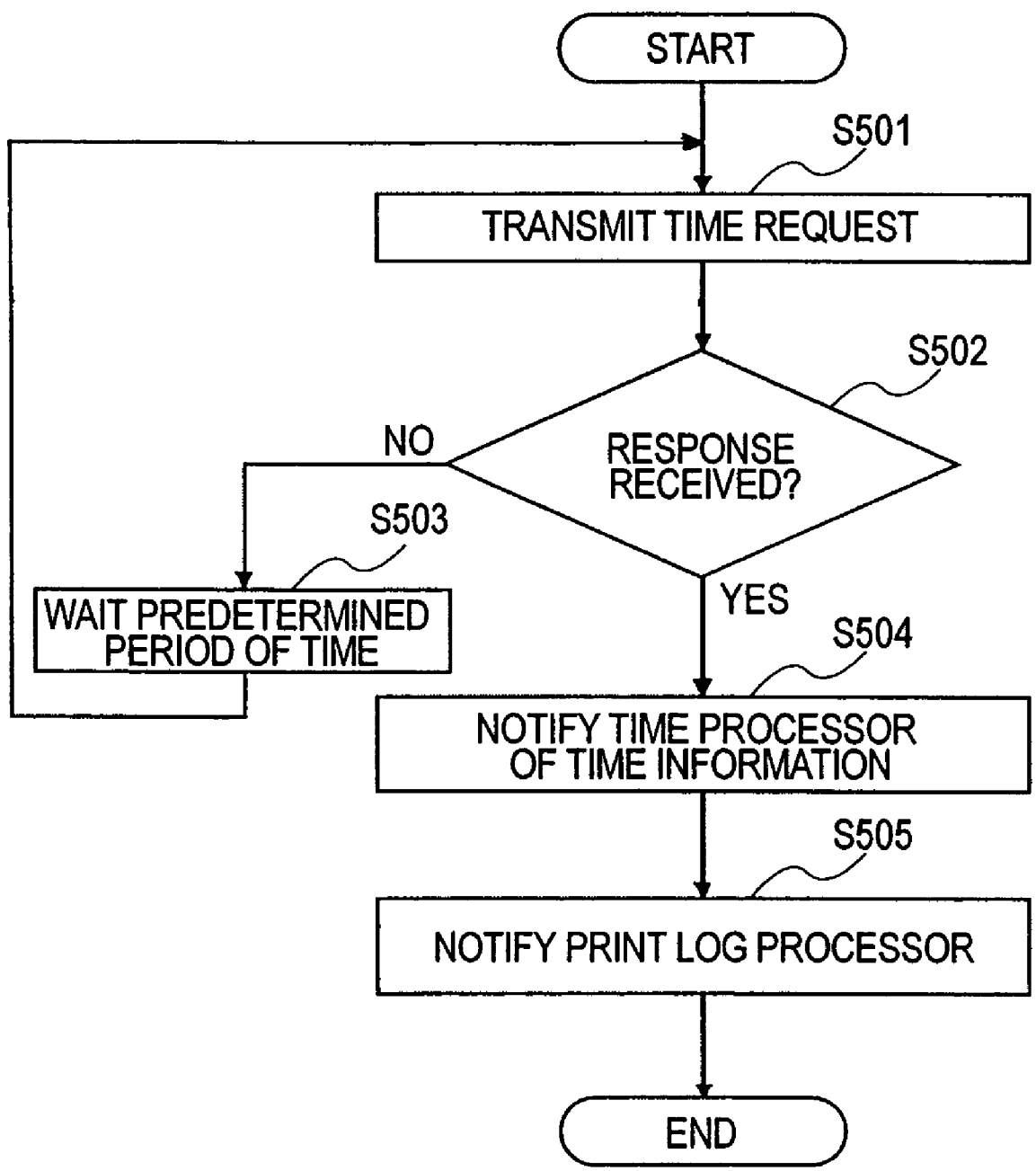
FIG. 5 is a flowchart showing an exemplary internal operation of a time obtaining unit 401.

FIG. 5 is a flowchart showing an operation of the time obtaining unit 401. In the first embodiment, time is obtained in the unicast mode in the aforementioned three SNTP modes. When the image forming device 201 is powered on, the time obtaining unit 401 starts the operation shown in FIG. 5. First, in step S501, the time obtaining unit 401 sends an SNTP packet having such a structure as shown in FIG. 1 as a request for obtaining time to the Internet protocol (IP) address of the server 204. At this time, the time obtaining unit 401 sets the mode to 3 (i.e., the client). The IP address of the server 204 is preset by the user using the operation panel 305 and is stored in the non-volatile memory 309.

Then, in step S502, the time obtaining unit 401 determines whether or not a response has been successfully received from the server 204. As long as there is no problem with the network environment or setting, the server 204 returns an SNTP packet having a structure similar to that shown in FIG. 1 in response to the request from the time obtaining unit 401. In the response from the server 204, the mode is set to 4 (i.e., the server), and the time information supplied from the server 204 is set in the Transmit Timestamp field. If the time obtaining unit 401 has received a response from the server 204, the flow proceeds to step S504. If the time obtaining unit 401 has not received a response from the server 204 for some reason, the flow proceeds to step S503.

In step S503, the time obtaining unit 401 waits a predetermined period of time (i.e., five minutes). Then, the flow returns to step S501. In step S504, the time obtaining unit 401 notifies the time processor 402 of the time information included in the received response. Then, in step S505, the time obtaining unit 401 notifies the print log processor 405 of the acquisition of the time. Then, the flow ends.

An internal clock notifies the time processor 402 of the elapsed time every one second. After the time processor 402 is notified of the time information indicating the current time in step S504, the time processor 402 updates the current time based on the notification from the internal clock so that the current time is counted based on the time indicated by the time information, and maintains the updated time. The time processor 402 also maintains the number of seconds elapsed since the image forming device 201 was powered on by counting the power-on elapsed time since the image forming device 201 was powered on based on the notification from the internal clock.

Figure 6:
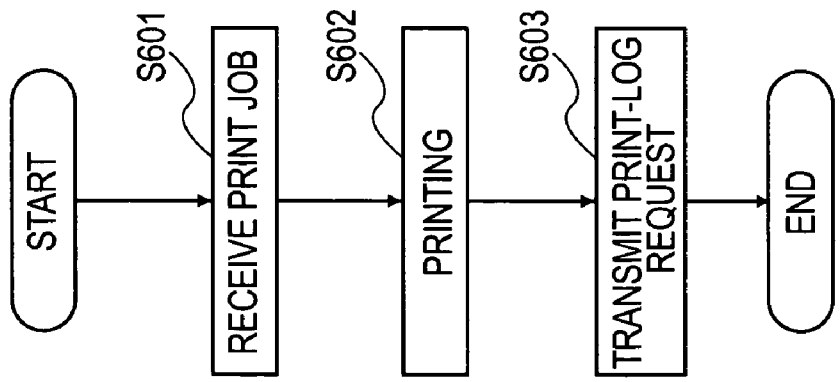
FIG. 6 is a flowchart showing an exemplary internal operation of a print processor 404.

FIG. 6 is a flowchart showing an exemplary operation of the print processor 404. In step S601, the print processor 404 receives a print job from a host computer. In step S602, the print processor 404 performs printing based on the received print job. The print processor 404 causes the print engine 310 to print an image based on the print job to perform the printing processing. In step S603, the print processor 404 transmits a request for generating a print log to the print log processor 405. Then, the flow ends.

Figure 7:
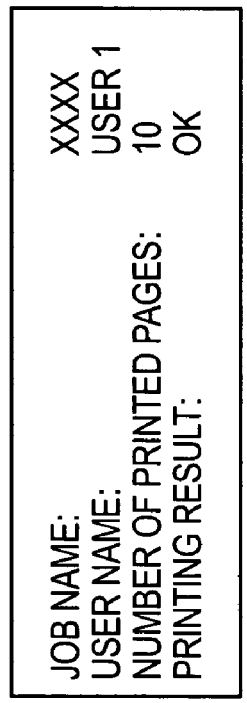
FIG. 7 is a diagram showing exemplary printing information included in a print log generating request.

FIG. 7 shows exemplary printing information included in the print-log request transmitted in step S603 shown in FIG. 6. The printing information includes, for example, a job name, a user name, the number of printed pages, and a printing result. The print log processor 405 performs various types of processing relating to a print log. Mainly, the print log processor 405 waits for any of three events discussed below, and, upon receipt of an event, starts the operation depending on the type of the received event.

Figure 8:
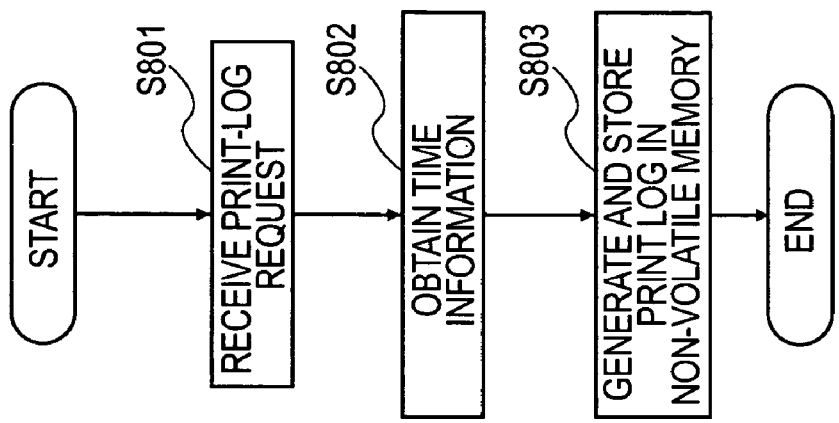
FIG. 8 is a flowchart showing an exemplary internal operation of a print log processor 405 in response to a print log generating request.

FIG. 8 is a flowchart showing the operation of the print log processor 405 in response to a print log generating request as a first event. In step S801, the print log processor 405 receives a print log generating request from the print processor 404. In step S802, the print log processor 405 obtains the current time information from the time processor 402. FIG. 9 shows the time information returned from the time processor 402. The time information includes, for example, a current time 901 and a power-on elapsed time 902. The current time 901 is set to the current time maintained by the time processor 402 if the time obtaining unit 401 successfully obtains time information from the server 204 and notifies the time processor 402 of the time information, or is set to 0, otherwise. The power-on elapsed time 902 is the number of seconds elapsed since the image forming device 201 was powered on.

Referring back to FIG. 8, in step S803, the print log processor 405 generates a print log based on the printing information shown in FIG. 7, which is included in the print log generating request, and the time information shown in FIG. 9, which is obtained from the time processor 402, and stores the generated print log in the non-volatile memory 309. FIG. 10 shows a print log generated by the print log processor 405. The exemplary print log includes a job name, a user name, the number of printed pages, a printing result, the printing time, and a period of time at the time of printing. However, it is noted various other types of information may be included in the print log. The printing time corresponds to the current time 901 shown in FIG. 9 and the period of time at the time of printing corresponds to the power-on elapsed time 902 shown in FIG. 9.

When the image forming device 201 receives a print job before obtaining the current time, the print log processor 405 sets the power-on elapsed time 902 as the period of time at the time of printing, and generates a print log. In this print log, the printing time is set to 0. When the image forming device 201 receives a print job after obtaining the current time, the print log processor 405 sets the current time 901 as the printing time, and generates a print log.

The print log processor 405 adds the print log generated in step S803 to the print logs previously stored in the non-volatile memory 309, and deletes the oldest print log if the total size of the print logs exceeds a certain amount.

FIG. 11 is a flowchart showing an exemplary internal operation of the print log processor 405 in response to a time obtaining event as a second event. In step S1101, the print log processor 405 is notified by the time obtaining unit 401 of the acquisition of the time. In step S1102, the print log processor 405 obtains time information from the time processor 402. The time information returned from the time processor 402 includes such information as shown in FIG. 9, and the current time 901 is set to not 0 but the current time. In step S1103, the print log processor 405 determines whether or not the print log stored in the non-volatile memory 309 includes a print job whose printing time is unknown. In a print job whose printing time is unknown, the printing time is set to 0. If a print job whose printing time is unknown is found, then, in step S1104, the print log processor 405 calculates the printing time for each print job whose printing time is unknown, and updates the print log based on the calculated printing time. In calculation of the printing time, the period of time at the time of printing in the print log whose printing time is unknown is indicated by T1 and the power-on elapsed time indicated by the time information obtained in step S1102 is indicated by T2. The print log processor 405 subtracts (T2−T1) seconds from the current time indicated by the time information obtained in step S1102 to determine the printing time. In this way, the period of time at the time of printing in the print log is transformed into the printing time.

Figures 12, 13:
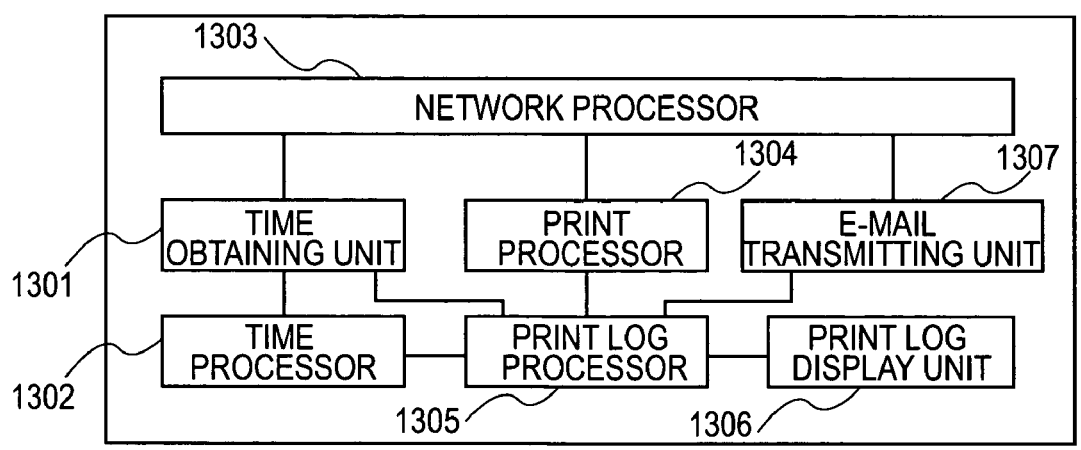
FIG. 12 is a diagram showing an exemplary print log displayed on an operation panel.
FIG. 13 is a block diagram showing an exemplary software configuration of an image forming device according to a second embodiment of the present invention.

In response to, as a third event, a print log obtaining request from the print log display unit 406, the print log processor 405 retrieves a print log maintained in the non-volatile memory 309 and transmits it to the print log display unit 406. The print log display unit 406 displays the print log returned from the print log processor 405 on the operation panel 305. FIG. 12 shows a print log displayed on the operation panel 305. A print job whose printing time is unknown is displayed so that the printing time is set to "UNKNOWN".

Second Exemplary Embodiment

An image forming device according to a second exemplary embodiment of the present invention will now be described below. The hardware configuration of the image forming device according to the second embodiment is similar to that according to the first embodiment shown in FIG. 3.

FIG. 13 is a block diagram showing an exemplary software configuration of the image forming device according to the second embodiment. The image forming device according to the second embodiment further includes an e-mail transmitting unit 1307 in addition to the components shown in FIG. 4.

The e-mail transmitting unit 1307 has functions for converting the print log generated by the print log processor 1305 into e-mail and transmitting the e-mail to the administrator of the image forming device via the network processor 1303. The e-mail address of the administrator and the IP address of an e-mail server are preset using the operation panel 305 and stored in the non-volatile memory 309.

The print log processor 1305 performs the processing shown in the flowchart of FIG. 8 in response to a print log generating request from the print processor 1304, and transmits the print log generated in step S803 to the e-mail transmitting unit 1307. The e-mail transmitting unit 1307 converts the received print log into an exemplary e-mail form shown in FIG. 14, and transmits the e-mail to the administrator. The content of the print log shown in FIG. 14 is similar to that of the print log shown in FIG. 10.

FIG. 15 shows an exemplary e-mail actually received by the administrator. A header 1501 is added by the e-mail server. The header 1501 includes time information indicating the time at which the e-mail server processed the e-mail. The time information included in the e-mail header 1501 allows the administrator to know the time at which printing was carried out even before the time obtaining unit 1301 in the image forming device obtains time information.

In a case where the image forming device receives a print job before obtaining the current time, the image forming device transmits a print log via e-mail. The e-mail server adds time information to the e-mail header, and the added time information is regarded as the printing time. In a case where the image forming device receives a print job after obtaining the current time, the image forming device sets the current time as the printing time, and generates a print log.

Third Exemplary Embodiment

An image forming device according to a third exemplary embodiment of the present invention will now be described below. The hardware configuration of the image forming device according to the third embodiment is similar to that according to the first embodiment shown in FIG. 3.

FIG. 16 is a block diagram showing an exemplary software configuration of the image forming device according to the third embodiment. When a time obtaining unit 1601 successfully obtains time information from a server, it notifies a time processor 1602 of the time information and then notifies a print processor 1604 of the acquisition of the time information. Upon receipt of a print job from a host computer, the print processor 1604 determines whether or not the notification has been received from the time obtaining unit 1601. The print processor 1604 performs the processing shown in the flowchart of FIG. 6 when the notification has been received from the time obtaining unit 1601, or, otherwise, notifies the host computer of an error and does not perform printing based on the print job. Therefore, it ensures that the print log includes the printing time.

In a case of receiving a print job before obtaining the current time, the image forming device does not perform printing and notifies the host computer of an error. In a case of receiving a print job after obtaining the current time, the image forming device sets the current time as the printing time and generates a print log.

As described above, according to the first embodiment, if the image forming device fails to obtain time information at the time of turning on power, the image forming device can specify the printing time of previously printed jobs when obtaining the time information later. According to the second embodiment, if the image forming device fails to obtain time information at the time of turning on power, the image forming device can notify the device administrator of the printing time via e-mail. According to the third embodiment, if the image forming device fails to obtain time information at the time of turning on power, the image forming device can disable the printing function to eliminate a print job whose printing time is unknown.

The foregoing embodiments can be implemented by a computer of the image forming device shown in FIG. 3 executing a program. Means for distributing the program to the computer, e.g., a computer-readable recording medium having the program recorded therein, such as a compact disc read-only memory (CD-ROM), or a transmission medium that carries the program, such as the Internet, may also constitute an embodiment of the present invention. A computer program product, such as a computer-readable recording medium having the program recorded therein, may also constitute an embodiment of the present invention. Such a program, recording medium, transmission medium, and computer program product are encompassed within the present invention. Recording media including, for example, a flexible disc, a hard disk, an optical disc, a magneto-optical disc, a CD-ROM, a magnetic tape, a non-volatile memory card, and a ROM may be used.

The aforementioned embodiments are merely exemplary implementations of the present invention, and the technical scope of the present invention should not be restrictively construed by these embodiments. A variety of implementations of the present invention may be made without departing from the technical scope and the principal feature of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-347073 filed Nov. 30, 2004, which is hereby incorporated by reference herein in its entirety.

What is claimed is:

1. A device comprising:
    a first counting unit configured to count an elapsed time from start of the device;
    an obtaining unit configured to obtain time information indicating time from a server device on a network;
    a second counting unit configured to count a current time based on the time indicated by the time information obtained by the obtaining unit;
    a generating unit configured to generate, based on the elapsed time counted by the first counting unit, job information relating to a job performed in the device before the obtaining unit obtains the time information, and to generate, based on the current time counted by the second counting unit, job information relating to a job performed in the device after the obtaining unit obtains the time information; and
    a display unit configured to display a log of the job performed in the device based on the job information generated by the generating unit,
    wherein the display unit displays the log of the job, including information to indicate that the time at which the job was performed is unknown, when the log of the job is displayed based on the job information generated based on the elapsed time.

2. The device according to claim 1, further comprising an updating unit configured to update time information in the job information based on the current time counted by the second counting unit and the elapsed time counted by the first counting unit after the obtaining unit obtains the time information.

3. The device according to claim 1, further comprising an e-mail transmitting unit configured to transmit the job information relating to the job performed in the device before the obtaining unit obtains the time information via e-mail.

4. The device according to claim 3, wherein the e-mail includes a header, and time information is added to the header by an e-mail server.

5. The device according to claim 1, wherein the obtaining unit obtains the time information using the simple network time protocol.

6. The device according to claim 1, wherein the job information generated by the generating unit includes at least one of a user name, a job name, the number of printed pages, and a printing result.

7. A data processing method comprising:
    counting an elapsed time from start of a device;
    obtaining time information indicating time from a server device on a network;

counting a current time based on the time indicated by the time information obtained from the server device;

generating, based on the counted elapsed time, job information relating to a job performed in the device before the time information is obtained from the server device, and generating, based on the counted current time, job information relating to a job performed in the device after the time information is obtained from the server; and displaying a log of the job performed in the device based on the generated job information, including information to indicate that the time at which the job was performed is unknown, when the log of the job is displayed based on the job information generated based on the elapsed time.

8. A computer readable medium containing comprising:

computer-executable instructions for counting an elapsed time from start of a device;

computer-executable instructions for obtaining time information indicating time from a server device on a network;

computer-executable instructions for counting a current time based on the time indicated by the time information obtained in the obtaining step;

computer-executable instructions for generating information relating to a job based on the elapsed time before the time information is obtained from the server device on the network; and computer-executable instructions for generating, based on the counted elapsed time, job information relating to a job performed in the device before the time information is obtained from the server device, and generating, based on the counted current time, job information relating to a job performed in the device after the time information is obtained from the server device;

computer-executable instructions for displaying a log of the job performed in the device based on the generated job information, including information to indicate that the time at which the job was performed is unknown, when the log of the job is displayed based on the job information generated based on the elapsed time.

* * * * *